Feb. 21, 1967 A. S. NORCROSS 3,304,765
SYSTEM OF VISCOSITY DETECTION
Filed Feb. 14, 1964 2 Sheets-Sheet 2

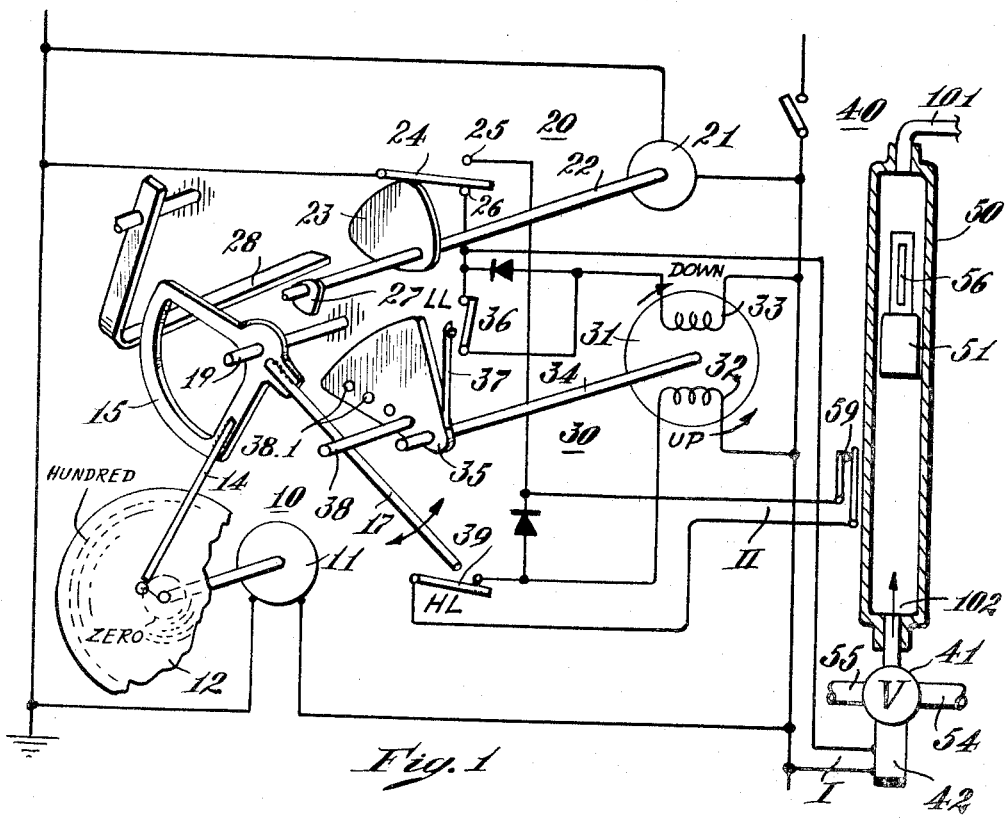

United States Patent Office 3,304,765
Patented Feb. 21, 1967

3,304,765
SYSTEM OF VISCOSITY DETECTION
Austin S. Norcross, 247 Newtonville Ave.,
Newton, Mass. 02158
Filed Feb. 14, 1964, Ser. No. 344,892
11 Claims. (Cl. 73—57)

The field of this invention is that of viscosity detection by forcing the fluid to be measured through a restricted orifice represented by a gap between a channel and a body moving therein.

Viscosity detecting devices of this general class are well known and one successful type is described in my Patent No. 2,491,389 of December 13, 1949, wherein samples are cyclically tested by means of a body, also referred to as piston, which is periodically lifted by and then released by mechanical means within a vessel containing the liquid sample and separated by a predetermined gap from the piston. The piston is then dropped through the liquid whereby the time of falling through a given height indicates the degree of viscosity of the liquid. The lifting means such as rods or chains can be arranged above or below the piston. Other systems indirectly lift the piston by reversing the vessel, turning it about 180° after the completed fall of the piston which will then be on top again for the next measurement. Various disadvantages are inherent in instruments of these types. The extraneous piston lifting devices which are associated with stationary containers introduce effects in addition to those intended for the measuring effect proper, thus introducing various inaccuracies. While detecting devices wherein the container is turned around between cycles do not require separate lifting appurtenances for the piston, they introduce severe impediments especially with regard to continuous fluid sample supply to the container.

Objects of the present invention are to provide the detecting components of viscosimeters of the above-mentioned type with a piston moving device which permits reciprocation of the piston unimpeded by any extraneous instrumentalities, thereby eliminating inaccuracies introduced by such gear; to provide a viscosity detecting unit which has a free fall period positively and solely responsive to and representative of the viscosity to be measured; to provide such a device which has considerably fewer parts as previous types, especially parts which might be subject to corrosion in the liquid to be measured, which is self-cleaning, which is particularly versatile and yet optimally simple, to provide such a device which provides for unique continuity of fluid flow therethrough and which can be inserted easily in conduits carrying fluids to be measured of shunted thereonto; to provide such a device which due to its construction inherently promotes better periodical continuity of the measuring cycles; to provide such a unit which can be tied with optimally simple linking circuitry, to indicating units including those of installations using different detecting components; and to provide a viscosimeter system which permits continuous uninterrupted flow of the fluid to be measured, with the consequent advantages of avoidance of settling out of particles, of comparative freedom from obstructions due to congealing, and of easier maintenance of constant detection temperature.

The substance of the present invention can be shortly summarized as involving, in a principal method as well as apparatus aspect, the passing of fluid for detecting its viscosity through a channel forming part of a duct with a body freely movable in either direction on a biasing force, such as a gravity component, within the channel with predetermined clearance; the ducts and channel are related by fluid control means which provide for periodical movement of the fluid oppositely to the biasing force thereby making the body ready for detection, and for stopping or slowing down the fluid flow permitting the biasing force to move the body through the liquid, the measured time of such movement with the said predetermined clearance being an accurate measure of the viscosity of the fluid. The return of the measuring body by the sample changing flow of the very fluid to be measured is particularly characteristic of this aspect of the invention.

In a preferred embodiment the fluid is cyclically propelled through the channel, each cycle comprising a body lifting period and a measuring body dropping period during which the fluid flow in the channel can be completely stopped or slowed down sufficiently to produce the above-mentioned restricted orifice effect; such fluid movement can be conveniently controlled by valve means actuated and timed by the indicating component of the viscosimeter. If desired, the gravational force on the body can be augmented during the measuring movement by auxiliary, such as spring means.

In another important aspect, the invention contemplates viscosity detection by cyclic variation of the relative speed of a fluid continuously flowing through a channel and a measuring body separated from the channel by a measuring gap. In the above-mentioned preferred embodiment, the detecting body is cyclically lifted by the fluid itself and slowed down between lifting periods such as by partly closing the valve means, care being taken that during the lifting periods the fluid moves fast enough to move the body, whereas during the detecting periods the relative speed is such that the fluid will properly move through the measuring gap, measurably affecting the body movement. However, it is understood that the principle of detection with continuous flow at variable speed can be carried out by way of any appropriate body control apparatus, including that herein disclosed and that described in my above-identified patent.

Another preferred specific aspect of the invention involves determination of the measuring time period by way of a circuit element, such as a magnetically operated proximity switch, that is affected by the moving body without possibly detrimental extraneous interaction between body and circuit element.

In an additional aspect, the body is a piston moving with clearance within a cylinder constituting the channel and leading into a duct at each end; at one end at least is the above-mentioned control valve for admitting fluid until the piston has reached a predetermined highest position whereupon the fluid is slowed down or stopped by the valve, and the piston allowed to drop in the stationary or slowed down fluid until it has operated the proximity switch, whereupon the cycle is repeated with the fluid alternately acting as piston lifting means and supplying a new sample.

In a further aspect, detecting components according to the invention are connected directly in the main duct carrying the fluid to be measured or in shunt with or without bypass to a main duct carrying the measured fluid.

These and other objects, advantages and inventive aspects of the substance of the invention will appear from the following description of its principles, mode of operation, and of several practical embodiments illustrating its novel characteristics.

The description refers to drawings in which:

FIG. 1 is a schematical representation of an entire viscosimetric system incorporating the invention;

FIG. 2 is a chart of the cycle of operation of apparatus according to FIG. 1;

Figure 3:
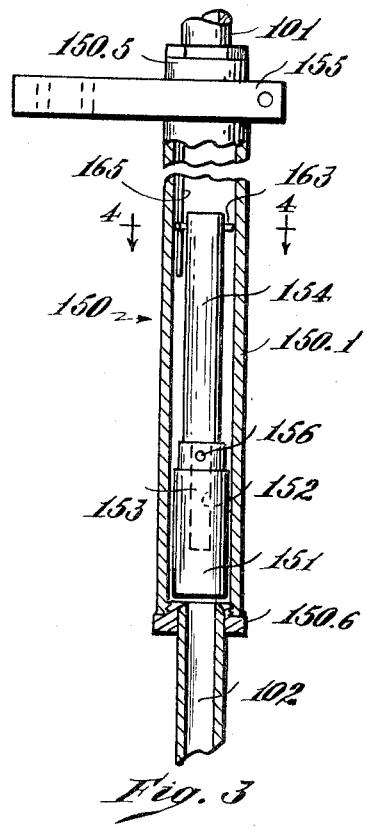
FIG. 3 is a longitudinal section through the measuring container and the piston therein.

The system shown in FIG. 1 has an indicating component to the left of circuitry links I and II and a detecting component to the right thereof. While the indicating unit and the linkage are not part of the present invention, they have to be described for a proper understanding of the latter.

The indicating component or station has a chart unit 10 with a motor 11 for driving a chart 12 of conventional circular configuration. The indicator means proper comprise here a recording pen 14, mounted on a clutch and brake segment 15 which is rotatably mounted on a fixed shaft 19. The segment 15 also has attached thereto a pen actuating follower 17 which is also capable of opening the normally closed full scale limit switch 39, herein also referred to as high limit switch.

A timer unit 20 has a timer motor 21 conveniently supplied from the same power line as the chart motor 11 and driving, by means of shaft 22, a cam 23 arranged to transfer during a predetermined period, beginning with a given angular position thereof, the contact or timer switch arm 24 from normally closed position on contact 26 to operating position on contact 25. The shaft 22 also carries a clutch operating cam or similar instrumentality indicated at 27 capable of lifting in a predetermined angular position at the end of each measuring cycle, the brake and clutch arm 28 from the segment 15, for the purpose of momentarily releasing the clutch to allow the pen to return, by gravity, spring or other biasing, to a lower position unless it is held by the pin 38, as will be described below.

A measuring unit 30 has a measuring motor 31 of the type which can be selectively operated in either direction by means of separate windings here designated as up-winding 32 and as down-winding 33. The motor 31 drives a shaft 34 which carries a range selector plate 35 with a switch operator 37 which in a given angular position of the plate opens a normally closed low limit switch 36, in the circuit of the down-winding 33 in series with the normally closed contacts 24, 26. An actuator pin 38 for operating the above-mentioned follower 17 can be placed in various range selecting positions upon the range selector plate 35, as indicated by perforations 38.1 for placing the pin 38 at various radii from the shaft 34 to move the follower 17 at preselected speeds. As indicated in FIG. 1, the switches which control the windings of motor 31 are bridged by rectifiers in well-known manner to stop this motor quickly by energizing the corresponding winding with direct current. The measuring motor 31 is capable of lifting the pen 14 by way of the pin 38, against the frictional torque applied by the brake and clutch arm 28 to the segment 15. This frictional torque between segment 15 and arm 28, while it can be overcome by the torque exerted by the measuring motor, is capable of holding the pen in viscosity indicating position, until the next measurement lowers or raises its reading, as will be described below. The so-called high limit switch 39 stops the measuring motor by energizing the up-coil 32 with direct current, when the pen has reached full scale such as "hundred" reading, in order to prevent overrunning. It should be understood that the designations "up-coil" and "down-coil" for 32, 33, respectively, refer to gravity biasing of plate 35 and segment 15, and hence to up and down movement of the pen.

The detecting component or station, shown in FIG. 1 to the right of links I and II will now be described in principle. This component is representative of the present invention. It has a container 50 having fluid supply ducts and ports 101, 102 at the top and bottom. It contains a measuring body or piston 51 carrying an actuating magnet 56. Adjacent to the lower port is a body lifting control valve 41. Upon fully opening this control valve by means of solenoid 42, fluid whose viscosity is to be measured is admitted from duct 54, lifting the piston 51 until the valve is again fully or partly closed by operation of the above-described indicating component and the linking circuitry as will be described below. Upon descending, the magnet 56 opens a normally closed measuring proximity switch 59 of known construction. It will be noted that the piston is freely lifted by the fluid to be measured, through which it descends during a following part of the cycle for purposes of viscosity measuring in terms of the duration of the descending period from the highest position of the piston until it reaches the proximity switch 59.

As indicated at 55, the valve 41 can be a three-way valve for example for the purpose of deviating the fluid during the measuring period.

The operation is comprehensively set forth in FIG. 2 and needs little further explanation beyond the following comments.

Assuming that the apparatus is in the condition at the beginning of the period charted in FIG. 2, the body cycling means which includes motors 21 and 31 with the switches pertaining thereto, causes the measuring piston 51 to rise and the measuring motor 31 with plate 35 to return to initial position, with valve 41 held open by 42 and the timer switch contacts 24, 26 closed. When the timing means 20 transfers contact 24 to 25, the body falling period begins, initiated through linkage I closing valve 41. The upwinding controlled measuring motor 31 rotates pin 38 in the opposite direction until the piston reaches a predetermined lower position, where the magnet 56 opens the measuring proximity switch 59 and by way of link II the motor 31 is stopped, here by energizing coil 32 with direct current and by the effect of the rectifier across open switch 59. Assuming first that the preceding viscosity measurement was lower, the pin 38 abuts, during the measuring period while motor 31 is running, the follower 17 which in turn rotates the segment 15 with pen 14. As indicated above, the driving torque of the segment 15 overcomes the frictional torque applied by the brake arm 28 and the pen 14 advances on the chart to the value corresponding to the viscosity of the sample just having been measured. Assuming on the other hand that the preceding viscosity measurement was higher and the pin 38 has not advanced as far as during the preceding cycle, the segment 15 is permitted to rotate towards a lower reading of the pen at the end of the measuring cycle when cam 27 momentarily releases the brake arm 28, as described above. It will now be evident that this lower reading is determined by the position of pin 38 at the time when the measuring motor is stopped by the opening of link II at the end of the measuring period. The low limit switch 38 opens at the end of the down movement of motor 31, stopping plate 35 in a position corresponding to zero indication of the pen if it were fully released. The high limit switch 39 opens when the pen is in uppermost, full scale position.

Figure 4:
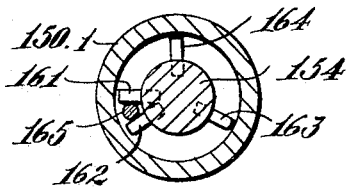
FIG. 4 is a cross section on lines 4—4 of FIG. 3.
Figure 5:
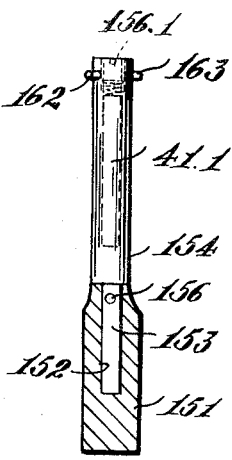
FIG. 5 is a separate view of the measuring piston with parts thereof broken away.

The detecting station described above with reference to FIG. 1 will now be explained more in detail with reference to FIGS. 3, 4 and 5.

In FIG. 3, numeral 150 denotes a cylinder corresponding to vessel 50 of FIG. 1 and 151 is a piston corresponding to body 51 of FIG. 1. The fluid admitting and delivering ports are again indicated at 101 and 102. In this embodiment, the detector vessel 150 consists of a piece of pipe 150.1 and two fittings 150.5, 150.6. The container 150 is fastened by convenient means for example a clamp 155, to a framework or chassis also carrying the other parts of the detecting component.

The detecting body 51 of FIG. 1 is here a piston consisting of a cylindrical body 151 having a cylindrical recess 152 (FIG. 5) for receiving the stud 153 of a magnet carrier 154 of non-magnetic material which is held by a set screw to the piston proper at 156. Pins 161, 162 cooperate with the rod 165 secured to the head plate 150.5 of the vessel to guide the piston in its up and down movement. The additional pins 163 and 164 serve, together with 162, for axially distancing the magnet carrying extension 154 from the cylinder 150.1 in order to avoid wedging or non-uniformity of the gap between the cylinder and the piston which must be so far as possible uniform around the entire periphery of the piston. The magnet 56 or 41.1 is secured in a recess of carrier 154 by means of a plug 156.1.

Figure 6:
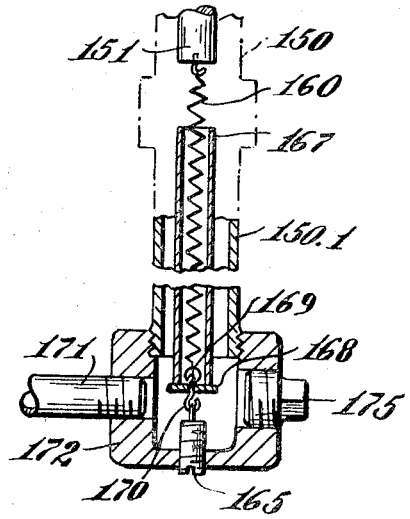
FIG. 6 is a longitudinal section similar to that of FIG. 3 through another embodiment of the invention.

It is sometimes desirable, especially in the case of particularly heavy fluids to add to the gravitational force of the measuring piston, and in such cases an auxiliary downward force is provided for example as indicated in FIG. 6. In this figure, 151 is again the measuring piston moving within the vessel 150. An auxiliary spring 160 is fastened at the one end to the piston and at the other, lower, end to a washer 162 carrying two fastening means 168, 169, such as hooks, one for the spring and another for an adjusting screw 170. A tube 167 surrounds the spring 161 resting on the washer 162 for the purpose of keeping the spring in tension during assembly. The conduit 171 at the lower fixture 172 corresponds to the supply port 102 of FIG. 3. A plug 175 provides access to the spring mounting arrangement.

In successfully operative embodiments, clearances between pistons of 0.748 to 0.500" diameter and cylinders of 0.750" diameter were found to be practical. It is quite easy in this construction to exchange the freely floating piston for changing the measuring gap clearance which is smaller for lighter liquids.

The detecting component can be inserted in any conduit by means of ducts 101 and 102 as shown in FIG. 1, with the fluid flow cyclically controlled by the valve 41, either for one-way periodical through flow or by means of a separate discharge during measuring and constant flow through a bypass as indicated at 55 of FIG. 1, in which case 41 is a three-way valve leading into duct 102.

Figure 7:
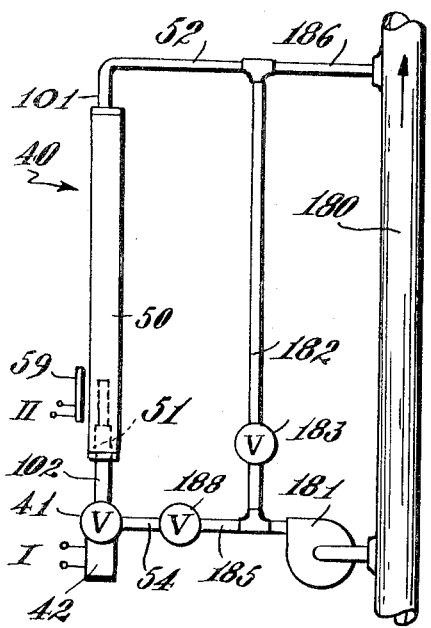
FIG. 7 is a schematical representation of a fluid conduit system incorporating the invention.

Instead, a bypass arrangement according to FIG. 7 can be used to advantage especially if a comparatively large fluid conduit has to be tapped for purposes of measuring the viscosity of the fluid therein. As shown in that figure, a pump 181 diverts fluid from the main duct 180, passes it towards the detecting unit 40 and back into 180. There are further a bypass conduit 182 with control valve 183, and measuring conduits proper 101, 102 controlled by valve 188. FIG. 7 also indicates the measuring vessel 50, the piston 51 and the proximity switch 59, the cyclic flow through the vessel 50 being provided by valve 41 controlled by solenoid 42 as above described. It will now be evident that by means of the bypass 182, and valves 183, 188, the velocity of the fluid in the indicating station can be regulated or the latter can be shunted out altogether.

The indicating station can be connected across a section of duct line containing a restriction providing a pressure drop that is sufficient to produce within the measuring vessel a flow capable of lifting the piston and of simultaneously supplying the next sample. Analogously, a pressure differential in the opposite sense introduced by a pump can be utilized for driving fluid through a detecting station connected across the pump.

Referring particularly to embodiments wherein the fluid passes the measuring channel continuously without stopping, but at cyclically varying speeds, it will be evident that this effect can be brought about by conventional valve means which do not completely close, in the place of valve 41 of FIG. 1. Other possibilities are for example to replace, in FIG. 7, the manually operated valve 183 with the cyclically controlled, completely closing valve 41. During the closing of valve 41, the flow through vessel 40 will be increased.

Installations with continuous flow have various advantages. The continuous flow prevents settling of material suspended in the fluid with consequent possibilities that the viscosity measurements of consecutive samples become distorted. Stagnant regions being avoided by the continuous flow, congealing of fluids which are subject to that contingency cannot occur. Continuous flow also facilitates maintenance of constant temperature due to the absence of possible heat reservoirs within the system.

It will be evident to those skilled in this art that signal lights for indicating the piston position can be added to the circuit of FIG. 1, by appropriate relay contacts, fully replacing the visual observation of mechanical piston actuating apparatus. It will also be evident that alarm apparatus for indicating given, especially high and low, viscosity values can be actuated from apparatus according to FIG. 1. Similarly, provisions for the automatic control of apparatus for handling and modifying the fluid of measured viscosity can be operated under control of this apparatus.

It should be understood that the present disclosure is for the purpose of illustration only and that this invention includes all modifications and equivalents which fall within the scope of the appended claims.

I claim:

1. Method of measuring the viscosity of fluids comprising the steps of:
    passing fluid at alternately different speeds other than zero through a channel containing a body with predetermined clearance and biased against the fluid flow,
    moving the body with the fluid against the bias during one period of the higher speed and then forcing the liquid through the clearance by the bias during another period of a speed sufficiently low to permit movement of the body against the flow, and
    measuring the time required by the body to move through a given distance during said other period.

2. Method according to claim 1, wherein said fluid passage is cyclical with each cycle including said first, body moving, period as well as said other, measuring, period.

3. Apparatus for measuring the viscosity of fluids, of the type that comprises:
    a channel forming part of a duct for confining flow of the fluid;
    a body freely movable in either direction within said channel with predetermined clearance;
    means for subjecting said body to a biasing force opposing the flow of said liquid;
    fluid control means for moving the fluid oppositely to said biasing force at a speed capable of moving the body against said force, and
    means for detecting a lowered position of said body;
    and which apparatus as an improvement further comprises:
    means associated with said fluid control means for slowing the fluid sufficiently for causing the biasing force to move the body through the liquid oppositely to its flow;
    whereby the time of flow opposing movement is a measure of the fluid viscosity and fluid flow is maintained during measuring.

4. Apparatus according to claim 3 wherein said fluid control means include means for cyclically varying continuous fluid flow through said channel each cycle consisting of a body movement following, and a body movement opposing said biasing force.

5. Apparatus according to claim 3 wherein said channel is oriented in a gravity force component which constitutes at least part of said biasing force.

6. Apparatus according to claim 5 further comprising spring means arranged to assist said gravity force component.

7. Apparatus according to claim 3 wherein said fluid control means includes a bypass around said channel and valve means for cyclically obstructing fluid flow in said bypass, whereby the fluid flow through the channel is increased when said valve means obstructs fluid flow in the bypass.

8. Apparatus according to claim 3, wherein said channel is constituted by a cylinder and said body includes a weighted piston freely moving with clearance within said cylinder.

9. Apparatus for measuring the viscosity of liquids, comprising:

a longitudinal detector channel in the direction of a gravity component, having fluid ports at each end thereof;

valve means adjacent to one of said ports for controlling the flow of liquid through said channel;

elongate piston means movable within said channel and clearing the channel with a measuring gap of predetermined essentially invariable width and of appreciable length, having an axially extending detecting means actuator of reduced diameter, and distancing means extending radially from the actuator for centering the piston and actuator during movement in the channel;

means for cyclically operating said valve means; and switch means adjacent said channel for detecting upon proximity of said actuator a lowered position of said piston means;

whereby the piston means can be raised to a predetermined position within the channel by fluid propelled upwardly through the channel, the piston means can then descend when the fluid flow is reduced or stopped by the valve means, and the detecting means will be actuated at a definite point of actuator proximity to indicate the time of descent of the piston which is a measure of the viscosity of the liquid.

10. Apparatus according to claim 9, further comprising:

a pipe line for continuously conducting a liquid whose viscosity is to be measured; and duct means arranged in shunt with said pipe line and containing in series said channel, and said valve means; and pump means for propelling fluid through said channel; whereby the cyclical opening and closing of the valve means and said pump means provide for continuously cyclic derivation of samples from said pipe line and for continuously cyclic detection of the lowered position of the piston means, and hence continuous viscosity measurement of the liquid flowing in the pipe line.

11. In an apparatus for measuring the viscosity of liquids, of the type that comprises:

a longitudinal detector channel in the direction of a gravity component, having fluid ports at each end thereof;

valve means for controlling the rate of liquid flow through said channel;

elongate piston means freely movable within said channel and clearing the channel with a gap of predetermined uniform width and of appreciable length;

means for cyclically controlling said valve means for passing fluid through said channel; and means for detecting a lowered position of said piston means;

the improvement of said valve means which includes means for appreciably lowering said rate of liquid flow during one period of each control cycle, as compared to a high rate of flow during another period;

whereby the piston means is raised to a predetermined position within the channel by fluid flowing upwardly through the channel during the high flow rate periods, the piston means then descends during the low flow rate periods, the detecting means indicates the time of descent of the piston means which is a measure of the viscosity of the liquid, and continuous liquid flow is maintained.

References Cited by the Examiner

UNITED STATES PATENTS

| | | | |
|---|---|---|---|
| 2,491,389 | 12/1949 | Norcross | 73—57 |
| 2,755,664 | 7/1956 | Chapman | 73—209 |
| 2,778,220 | 1/1957 | Kuhlmann et al. | 73—57 |

FOREIGN PATENTS

| | | |
|---|---|---|
| 151,103 | 1962 | Russia. |
| 899,369 | 6/1962 | Great Britain. |

DAVID SCHONBERG, *Primary Examiner.*